United States Patent [19]

Schnee et al.

[11] 3,936,547
[45] Feb. 3, 1976

[54] PROCESS OF PREPARING MELAMINE RESIN FILMS BY IMPREGNATION OF PAPER, CELLULOSE, FLEECE OR FABRIC

[75] Inventors: Karl Schnee, Dornigheim; Dieter Tichy, Frankfurt am Main; Walter Michel, Frankfurt am Main; Gunter Gruber, Frankfurt am Main, all of Germany

[73] Assignee: Cassella Fabwerke Mainkur Aktiengesellschaft, Germany

[22] Filed: Feb. 14, 1974

[21] Appl. No.: 442,644

[30] Foreign Application Priority Data

Feb. 24, 1973   Germany.............................. 2309334

[52] U.S. Cl.......... 427/390; 162/164 R; 160/29.4 R; 427/391; 428/530
[51] Int. Cl.² ...................... B05D 3/02; C08L 61/20
[58] Field of Search...... 117/155 L, 161 L, 161 LN; 427/390, 391; 428/530; 260/29.4 R, 72 R, 72.5; 162/164

[56] References Cited
UNITED STATES PATENTS

| | | | |
|---|---|---|---|
| 2,773,793 | 12/1956 | Fraser et al..................... | 117/155 X |
| 2,908,603 | 10/1959 | Scott............................... | 117/155 X |
| 3,137,667 | 6/1964 | Gassmann et al................ | 117/155 X |
| 3,159,593 | 12/1964 | Morini et al..................... | 117/155 X |
| 3,200,008 | 8/1965 | Holtschmidt et al............. | 117/155 L |
| 3,318,760 | 5/1967 | Boenig et al..................... | 117/155 X |
| 3,520,715 | 7/1970 | Meiser............................. | 117/155 X |

*Primary Examiner*—Michael R. Lusignan
*Attorney, Agent, or Firm*—Connolly and Hutz

[57] ABSTRACT

Melamine resin films prepared by impregnating paper, cellulose fleece or fabric with a solution of a monomeric dimethylolmelamine mon-, di- or trimethylether, monomeric trimethylolmelamine mono-, di or trimethylether or a mixture thereof and drying the same at temperatures of about 130° to about 180°C.

8 Claims, No Drawings

PROCESS OF PREPARING MELAMINE RESIN FILMS BY IMPREGNATION OF PAPER, CELLULOSE, FLEECE OR FABRIC

In the furniture industry, melamine resin films are used for coating wood chip boards, molded fiber boards, plywood, and other wood materials. Melamine resin films are prepared by impregnating paper webs, cellulose fleece or fabric webs with an aqueous solution of a melamine resin and subsequently drying the same. The melamine resin films prepared in such a manner are adhered to the wooden substrate by applying heat and pressure and using an adhesive material. Urea resins filled with cellulose powder, melamine resins and/or chips thereof as well as so-called cold glues based on a polyvinyl acetate dispersion are customarily used as the adhesive material. However, the melamine resin films may also be provided with a coating of glue based on a urea resin, a melamine resin or a polyvinyl-acetate dispersion or mixtures of the individual constituents and may then be processed as the so-called self-adherent films. The resulting wooden materials laminated with the melamine resin films generally are coated with polyester, nitro or acid-catalyzed varnishes.

The melamine resin films prepared with the previously used melamine resins are insufficiently elastic and water-resistant for some purposes. It is, however, known that elasticity and consequently the bending radius may be improved if certain modifying agents, such as glycols, are added to the melamine resin. With the improvement in elasticity which is thereby obtained, there is associated, however, an impairment of water-resistance, so that for some purposes, e.g., edging profiles, the melamine resin films are not satisfactory.

According to the present invention, melamine resin films may be prepared having good elasticity, as well as advantageous water-resistance and lacquer adhesion properties. The invention relates to a process for the preparation of melamine resin films by impregnating paper, cellulose fleece or fabric with an improved melamine resin solution and subsequent drying. The novel process is characterized in that monomeric dimethylolmelamine mono-, di- or trimethylether, monomeric trimethylolmelamine mono-, di- or trimethylether or a mixture thereof is used as the resin.

In the process of this invention, paper, cellulose fleece and fabric weighing, for example 80 to 350 g./m$^2$ may be used. These are, as usual, processed in continuous rolls.

The paper, the cellulose fleece or the cellulose fabric is impregnated with a solution of monomeric dimethyolmelamine monomethylether, dimethylolmelamine dimethylether, trimethylolmelamine monomethylether, trimethylolmelamine dimethylether, trimethylolmelamine trimethylether or a mixture of two or more of these ethers.

The above ethers or a mixture of these ethers may be used dissolved in water or in any suitable organic solvent for the ethers. Suitable organic solvents, for example, include aromatic hydrocarbons such as benzene, lower ketones such as acetone or methylethyl ketone and acid amides such as dimethylformamide. Particularly preferred are lower alkanols having 1 to 4 carbon atoms such as methanol, isopropanol and isobutanol. Mixtures of various solvents, e.g., water-alkanol mixtures, may also be used.

Impregnation of the paper, the cellulose fleece or fabric with solutions of the aforesaid ethers in organic solvents or in admixture with water and water-miscible organic solvents for the most part is particularly advantageous, since such solutions have lower surface tensions and, therefore, penetrate easily and deeply into the material to be impregnated. Solutions of the ethers in alkanols with 1 to 4 carbon atoms or mixtures thereof with water are particularly suitable for this purpose.

Impregnation is undertaken in a manner known per se, e.g., by dipping, spraying, coating or rolling. Subsequently, the impregnated material is dried, suitably at temperatures of about 90° to 200°C., preferably of about 130° to about 180°C., to a volatile content of 0.5% to 5%, preferably of 1 to 2 % by weight. Impregnation is preferably undertaken in such a manner that 20 to 45% by weight, and even more, preferably 35 to 40% by weight of resin, related to the weight of the finished film, is brought onto the material.

For curing the resin, 0.1 to 5% by weight, based on the solid resin, of an acid reacting compound, such as alcoholic hydrochloric acid, p-toluene sulfonic acid or ammonium chloride may be added to the resin solution. For a further improvement of water-resistance, 1 to 5% by weight, based on the solid resin, of o- and/or p-toluene sulfonamide may be added to the resin solution. For the achievement of a high gloss finish on the coated melamine resin film a polyvinyl acetate dispersion may be added to the resin solution.

The necessary ethers of dimethylolmelamine or trimethylolmelamine may be prepared by the etherification of dimethylolmelamine or trimethylolmelamine with methanol. In the etherification, an acid catalyst, e.g., sulfuric acid or hydrogen chloride is added. If in the etherification, the procedure is carried out without water, there is obtained from dimethylolmelamine, dimethylolmelamine dimethylether and from trimethylolmelamine, trimethylolmelamine trimethylether. If the etherification is carried out with the addition of water, then the corresponding mono- or diethers are obtained in accordance with the quantity of the water added. It is immaterial in the process of this invention that the ethers used, e.g., the trimethylolmelamine dimethylether, probably are obtained in this type of etherification as a mixture of various ethers and not as a uniform product. The mono- and dimethylethers of the tri- or dimethylolmelamine or the trimethylolmelamine trimethylether prepared in such a manner are water-soluble monomeric substances.

Specific details for the preparation of the aforesaid ethers are contained in the examples which illustrate the present invention. Temperatures are in degrees Centigrade, percentages are in percent by weight and parts are parts by weight.

EXAMPLE 1

There are introduced into 60 kg. water, 40 kg. trimethylolmelamine trimethylether and 2 kg. 15% alcoholic hydrochloric acid. In this solution a decorative paper weighing about 120 g./m$^2$ and prepared of cellulose is impregnated and dried at a temperature of 170°. For further processing preference is given to a resin content of 35 – 38%, based on the weight of the finished film, and a volatile content of 2%. The melamine resin film thus prepared may be pressed onto a wood chip board using wet glue consisting of 100 parts urea resin (commercial Kaurit 390)

20 parts cellulose powder
1 – 2 parts ammonium chloride

The wet glue application amounted to 120 g./m². Pressing was undertaken for 120 seconds at a temperature of 160° under a pressure of 6 ka./cm². After removing from the hot mold and air cooling of the material, coating was accomplished with a commercial polyester varnish.

The determination of the residual moisture content (volatile content) occurred by differential weighing after a 5-minute drying at 160°.

The trimethylolmelamine trimethylether may be prepared by cooling a mixture of 100 parts by weight trimethylolmelamine and 200 parts by weight dry methanol to a temperature of +5°. While stirring at this temperature, dry hydrogen chloride is introduced up to the point of saturation and the trimethylolmelamine dissolves to form a limpid solution. The reaction mixture is then carefully mixed with sodium methylate up to a pH of 8 to 9, the temperature being maintained below 20°. The precipitated sodium chloride is filtered off and the solution concentrated at temperatures below 20°. Further precipitated sodium chloride is also separated. Concentration is continued until a thick syrup remains. Upon standing, the trimethylolmelamine trimethylether crystallizes out as white crystals.

EXAMPLE 2

There are introduced into 65 kg. water, 35 kg. dimethylolmelamine dimethylether and 0.35 kg. p-toluene sulfonic acid. In this solution, a decorative paper weighing 80 g./m² is impregnated to a resin proportion of 35% and dried at 180° to a volatile content of 1%.

In a second coating process, this melamine resin film receives a glue application consisting of 70 parts melamine resin (commercial Madurit 5238 N liquid in a 55% aqueous solution), 30 parts polyvinyl acetate dispersion (Mowilith DHL) and 0.1 part ammonium chloride.

The reserve side glue application amounts to about 40 g./m² (solid resin). The total volatile content of the film amounts to about 2.5% after a second drying. This film is pressed for 3 minutes onto a wood chip board at 140° and under a pressure of 8 kp./cm². Further processing is carried out in accordance with Example 1.

The dimethylolmelamine dimethylether may be prepared in accordance with the method of preparation given in Example 1 for trimethylolmelamine trimethylether if dimethylolmelamine is used in place of trimethylolmelamine.

EXAMPLE 3

There are introduced into 25 kg. water and 35 kg. isopropylalcohol, 40 kg. trimethylolmelamine trimethylether and 2.5 kg. 15% alcoholic hydrochloric acid in sequence.

In this solution, a cellulose carrier sheet weighing about 250 g./m² is impregnated to a resin content of 25%. It is then dried at 130° to a volatile content of less than 1%.

The melamine resin film subsequently receives a lacquer application of an acid-catalyzed commercial lacquer in an amount of about 30 g./m², and is glued as an edging profile to a wood chip board edge using a commercial synthetic resin adhesive.

EXAMPLE 4

There are introduced into 60 kg. isobutanol, 40 kg. dimethylolmelamine monomethylether and 800 g. p-toluene sulfonic acid.

In this solution, a soda craft paper weighing about 80 g./m² is impregnated to a resin proportion of 35–38%. It is then dried to a volatile content of 2.5%. This melamine resin film is subsequently pressed onto a wood fiber hard board using a wet glue according to Example 1. The curing time is 90 seconds at a pressure of 30 kp./cm² and a temperature of 140°. After cooling, the coated material receives a lacquer application of a pigmented polyester lacquer.

The necessary dimethylolmelamine monomethylether may be prepared in accordance with the method of preparation given in Example 1 for trimethylolmelamine trimethylether if dimethylolmelamine is used in place of the trimethylolmelamine and the methanol is diluted with water up to 30%.

What is claimed is:

1. A process for preparing a melamine resin film which comprises impregnating paper, cellulose fleece or fabric with a solution of monomeric dimethylolmelamine monomethylether, dimethylolmelamine dimethylether, trimethylolmelamine monomethylether, trimethylolmelamine dimethylether, or trimethylolmelamine trimethylether or a mixtue thereof and drying the same at temperatures of about 90° to about 200°C., preferably of 130° to 180°C.

2. The process of claim 1 wherein an alkanol having 1 to 4 carbon atoms is used to form the monomer solution.

3. The process of claim 1 wherein aqueous alkanol having 1 to 4 carbon atoms in said alkanol is used to form the monomer solution.

4. The process of claim 1 wherein the impregnation incorporates 20 to 45% by weight of resin based on the weight of the dried film.

5. The process of claim 1 wherein the impregnation incorporates 35 to 40% by weight of resin based on the weight of the dried film.

6. The process of claim 1 wherein 0.1 to 5% by weight, based on the resin content of said film, of an acid reacting compound is added to the monomer solution employed for impregnating.

7. The process of claim 6 wherein said acid reacting compound is alcoholic hydrochloric acid, p-toluene sulfonic acid or ammonium chloride.

8. The process of claim 1 wherein 1 to 5% by weight, based on the resin content of said film, of o-toluene sulfonamide or p-toluene sulfonamide or a mixture thereof is added to the monomer solution.

* * * * *